Patented June 16, 1936

2,044,585

UNITED STATES PATENT OFFICE 2,044,585

PREPARATION OF MOLDED ARTICLES

Maurice L. Macht, Jersey City, N. J., assignor to Dupont Viscoloid Company, Wilmington, Del., a corporation of Delaware No Drawing. Application May 22, 1934, Serial No. 726,951

6 Claims. (Cl. 18—61)

This invention relates to the preparation of molded articles and, more particularly, to an improved process of preparing molded articles having veined or mottled effects characterized by continuous bands or zones of contrasting color.

There is a considerable commercial demand for molded articles of varigated veined or mottled appearance. In Alan F. Randolph application Serial No. 722,487, filed April 26, 1934, entitled "Plastic compositions", is disclosed an improved method of obtaining such molded articles by employing a granular molding compound made up of particles containing different proportions of two or more colors. Such a method is particularly suited for producing fine grained and soft mottled effects, due to a superior blending of contrasting colors. This method does not provide means for producing long unbroken veins or zones of contrasting color such as are required in the imitation of onyx, certain varieties of tortoise shell, and imitations of similar materials.

An object of the present invention is to provide an improved process of preparing molded articles having veined or mottled effects characterized by continuous bands or zones of contrasting color. A further object is to provide a simple and economical process of preparing such molded articles. Other objects of the invention will be apparent from the description given hereinafter.

The above objects are accomplished according to the present invention by superficially coloring at least part of the surface of solid fragments of a molding compound having a contrasting color, placing two or more of such fragments in a die and molding under heat and pressure, whereby said fragments are flowed and pressed together into a unitary article.

In molding shop practice it is customary to pellet the granular molding compound in a pelleting machine in order that the compound may be put in a condition in which it can be readily placed in dies for molding. This pelleting simply comprises compacting the individual granules under a heavy blow, or the like, to give an aggregate of cohering granules retaining their individual characteristic granular structure. These pellets are, therefore, porous and characterized by minute interstices between the granules throughout as contrasted to the continuous, nonporous structure of a fully colloided plastic such as obtained by molding the pellets under heat and pressure so that the individual pellets melt and flow into each other.

In a preferred form of the invention the solid fragments of the molding compound are these pellets which are superficially colored on all or part of their surface and then used in molding according to ordinary practice. However, the invention may be carried out by employing any solid fragment of the molding compound, so long as at least two fragments are used in the die in which the article is molded, and further provided that the solid fragment is at least of sufficient size so that the coloring matter applied on the surface does not penetrate throughout the fragment. It will be understood that to obtain visual effects the superficial coloring must contrast with the color of the molding compound.

The following examples, wherein parts are given by weight, illustrate specific embodiments of the present invention:—

Example 1

A granular cellulose acetate molding powder of ordinary composition was pelleted in a standard pelleting apparatus according to well known practice. The size of the pellet was such that four pellets supplied the required volume of molding compound to fill the die to be used for the article to be molded, e. g., a comb. These pellets were of such shape and size that, although laid in a horizontally placed die in approximately horizontal position, they nevertheless overlapped each other slightly.

The pellets were pill shaped, although appreciably larger than an ordinary pill, and were stacked up so that only the narrow faces were exposed. The stack was then sprayed with a solution of dyestuff by means of a spray gun, with the result that the narrow faces of the pellets which occupied a substantially vertical position when placed in the mold, became coated, or no more than superficially impregnated with the dyestuff. The solution of dyestuff consisted of:

| | Parts |
|---|---|
| Ethyl alcohol | 40 |
| Ethyl acetate | 40 |
| Ethyl lactate | 20 |
| Diamond green | 0.05 |

After being sprayed the pellets were dried to remove the volatile matter in the coloring solution and were then placed in the comb mold. The mold was subjected to heat and pressure according to ordinary practice and there resulted an article having continuous bands or veins of sharply contrasting color.

The coloring matter may be applied not only to the edges of the pellets but to the whole surface, or any part thereof, and application may be made by spraying, brushing, dipping, or the like. The vehicle carrying the coloring matter may or may not be a solvent for the molding compound being treated. Where the vehicle is a good solvent for the binder ingredient of the molding compound, the penetration of the color into the pellet or fragment will be very shallow since the surface of the pellet or fragment will immediately be glazed over and there will be little capillary absorption of the liquid by the pores beneath the surface glaze. On the other hand, if the vehicle for the color be a non-solvent for the binder ingredient of the molding compound, there is likely to be a noticeable penetration by capillarity into pores and interstices well below the surface of the pellet, although by no means completely saturating the pellet. Obviously, in these two cases the zones or strata of color thus formed in the subsequently molded article will be of a different character, particularly as regards width and sharpness of definition. Also there may be used as the vehicle for the coloring matter a solution of the binder ingredient of the molding compound in question, or of other material capable of entering suitably into the structure of the molded article. Other soluble dyestuffs may be used, or insoluble pigments, a considerably different effect being obtained if an opaque pigment is employed rather than a soluble dyestuff.

Other combinations of coloring matters and vehicles suitable for application to cellulose acetate molding compounds are given in the following examples and it will be apparent that analogous selections may be made for application to molding compounds of other bases:

*Example 2*

| | Parts |
|---|---|
| Ethyl alcohol | 40 |
| Acetone | 40 |
| Methyl ether of ethylene glycol | 20 |
| Cellulose acetate | 2 |
| Victoria blue | 0.02 |

This illustrates a soluble dyestuff in a vehicle of cellulose acetate capable of entering into the structure of the molded article. The fragments, after being superficially coated with this composition, would be dried in order to allow the volatile ingredients to evaporate, such as the ethyl alcohol and acetone.

*Example 3*

| | Parts |
|---|---|
| Ethyl alcohol | 60 |
| Ethyl acetate | 40 |
| Cellulose acetate | 2 |
| Titanium dioxide | 5 |

This illustrates a vehicle analogous to that given in Example 2 but having as the coloring matter an insoluble opaque pigment rather than a soluble dyestuff.

*Example 4*

| | Parts |
|---|---|
| Water | 100 |
| Diamond green | 0.05 |

This illustrates a simple composition where a water soluble dye is being employed.

*Example 5*

| | Parts |
|---|---|
| Methanol | 100 |
| Diamond green | 0.05 |

This example illustrates a simple formula for use with a dye-stuff soluble in methanol.

It is to be understood that the above examples are merely illustrative and that the invention is in no sense limited to cellulose acetate but is applicable to other cellulose derivative compositions and to other molding compounds adapted to be formed into articles by molding under heat and pressure. Other types of molding compositions include cellulose ether compositions such as ethyl cellulose, polyvinyl resin compositions such as polyvinyl acetate and aldehyde modified polyvinyl resins and resins having a base of polymerized acrylic or alkacrylic acids and their esters, as for example, methyl methacrylate. Urea formaldehyde resins likewise are suitable for this use.

Those skilled in this art will readily appreciate that an unlimited number of effects can be obtained by simple variations in the process. The application of the contrasting color may be made upon any or all faces of the pellets or fragments in either a regular or a random manner to produce mottled or veined effects of different types. Also more than a single coloring matter may be used in preparing the component pellets or fragments for a single article and these pellets or fragments may be given one color on one face and another on another face, if desired. The nature of the veined or mottled effect obtained can also be varied by varying the shape and/or size of the pellets or fragments and the number of such pieces to be used per finished article. Also fragments of different shapes may be combined to form a single article. A convenient method of producing fragments of various shapes is the production first of relatively large pellets or fragments of any convenient shape and then the subsequent breaking of these at random to form irregular smaller pieces which may then be treated with color in accordance with the invention.

In general, in a group of articles molded from pellets or fragments treated in accordance with the present invention, there will be individual variation of the pattern of the mottle or vein but the group of articles made under similar conditions will be duplicates or mates in the sense that two pieces of marble cut from the same vein are mates, although not of identical pattern in detail.

An advantage of the present invention is that it provides an extremely simple and easy method of preparing molded articles having veined or mottled effects characterized by continuous bands or zones of contrasting color. These veins or mottles may be rectilinear, or curved, or of any other shape, depending upon specific variations of procedure, as heretofore described. Although such effects could be obtained heretofore through the use of sheet or block plastics, this involved the additional technique of operating on mixing rolls, double cake pressing, and other manipulative steps which required an appreciable degree of skill and added greatly to the cost of production, whereas the same effects can be produced according to the present invention practically as readily as a solid color mottled article can be produced.

As many apparently widely different embodiments of this invention may be made without departing from the spirit and scope thereof, it is to be understood that the invention is not limited to the specific embodiments thereof except as defined in the appended claims.

I claim:

1. Process of preparing molded articles having veined or mottled effects characterized by continuous bands or zones of contrasting color, comprising pelleting a granular molding compound to give pellets composed of an aggregate of cohering granules retaining their individual characteristic granular structure, applying to at least part of the surface of the pellets thus formed coloring matter in a liquid vehicle, said coloring matter contrasting in color from that of the molding compound, drying said pellets, placing said pellets in a die, and molding under heat and pressure whereby said pellets are flowed and pressed together into a unitary article.

2. Process of preparing molded articles having veined or mottled effects characterized by continuous bands or zones of contrasting color, comprising pelleting a granular molding compound to give pellets composed of an aggregate of cohering granules retaining their individual characteristic granular structure, applying to at least part of the surface of the pellets thus formed coloring matter in a liquid vehicle having no solvent action on the molding compound, said coloring matter contrasting in color from that of the molding compound, drying said pellets, placing said pellets in a die, and molding under heat and pressure whereby said pellets are flowed and pressed together into a unitary article.

3. Process of preparing molded articles having veined or mottled effects characterized by continuous bands or zones of contrasting color, comprising pelleting a granular molding compound to give pellets composed of an aggregate of cohering granules retaining their individual characteristic granular structure, applying to at least part of the surface of the pellets thus formed coloring matter in a liquid vehicle which is a good solvent for the binder ingredient of the molding compound, said coloring matter contrasting in color from that of the molding compound, drying said pellets, placing said pellets in a die, and molding under heat and pressure whereby said pellets are flowed and pressed together into a unitary article.

4. Process of preparing molded articles having veined or mottled effects characterized by continuous bands or zones of contrasting color, comprising pelleting a granular molding compound to give pellets composed of an aggregate of cohering granules retaining their individual characteristic granular structure, applying to at least part of the surface of the pellets thus formed a solution of a dyestuff, said dyestuff contrasting in color from that of the molding compound, drying said pellets, placing said pellets in a die, and molding under heat and pressure whereby said pellets are flowed and pressed together into a unitary article.

5. Process of preparing molded articles having veined or mottled effects characterized by continuous bands or zones of contrasting color, comprising pelleting a granular molding compound to give pellets composed of an aggregate of cohering granules retaining their individual characteristic granular structure, applying to at least part of the surface of the pellets thus formed an opaque pigment suspended in a liquid vehicle, said pigment contrasting in color from that of the molding compound, drying said pellets, placing said pellets in a die, and molding under heat and pressure whereby said pellets are flowed and pressed together into a unitary article.

6. Process of preparing molded articles having veined or mottled effects characterized by continuous bands or zones of contrasting color, comprising pelleting a granular cellulose acetate molding compound to give pellets composed of an aggregate of cohering granules retaining their individual characteristic granular structure, superficially coloring with a contrasting color at least part of the surface of the pellets thus produced, placing said pellets in a die, and molding under heat and pressure whereby said pellets are flowed and pressed together into a unitary article.

MAURICE L. MACHT.